United States Patent
Shirai et al.

(10) Patent No.: US 6,466,968 B2
(45) Date of Patent: Oct. 15, 2002

(54) INFORMATION PROCESSING SYSTEM CAPABLE OF FILE TRANSMISSION AND INFORMATION PROCESSING APPARATUS IN THE SYSTEM

(75) Inventors: Masahiko Shirai, Yokohama; Takeshi Baba, Kawasaki; Akiya Nakai, Tokyo; Shuji Yamoto, Tokyo; Tokuko Kanda, Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/092,869

(22) Filed: Jun. 8, 1998

(65) Prior Publication Data

US 2001/0042093 A1 Nov. 15, 2001

(30) Foreign Application Priority Data

Jun. 10, 1997 (JP) .............................. 9-152647

(51) Int. Cl.[7] .............................................. G06F 15/16
(52) U.S. Cl. ...................................... 709/206; 709/245
(58) Field of Search ................................ 709/206, 201, 709/217, 238, 229, 224, 225, 223, 203

(56) References Cited

U.S. PATENT DOCUMENTS

| | | | | |
|---|---|---|---|---|
| 5,613,108 A | * | 9/1997 | Morikawa | 393/616 |
| 5,737,539 A | * | 4/1998 | Edelsen et al. | 395/203 |
| 5,765,170 A | * | 6/1998 | Morikawa | 707/200 |
| 5,781,901 A | * | 7/1998 | Kuzuma | 707/10 |
| 5,805,810 A | * | 9/1998 | Maxwell | 709/206 |
| 5,867,162 A | * | 2/1999 | O'Leary et al. | 345/352 |
| 5,890,170 A | * | 3/1999 | Sidana | 707/501 |
| 5,903,723 A | * | 5/1999 | Beck et al. | 709/200 |
| 5,913,028 A | * | 7/1999 | Wang et al. | 709/203 |
| 5,920,404 A | * | 7/1999 | Weiser | 358/434 |
| 5,923,846 A | * | 7/1999 | Gage et al. | 709/213 |
| 5,951,638 A | * | 9/1999 | Hoss et al. | 709/206 |
| 6,014,688 A | * | 1/2000 | Venkatraman et al. | 709/206 |
| 6,038,603 A | * | 3/2000 | Joseph | 709/228 |

OTHER PUBLICATIONS

Kilcullen, Introducing Mcicrosoft Exchanger, Microsoft Press, ISBN1–55615–941–2, 1996.*

* cited by examiner

Primary Examiner—Robert B. Harrell
Assistant Examiner—Bunjob Jaroenchonwanit
(74) Attorney, Agent, or Firm—Fitzpatrick, Cella, Harper & Scinto

(57) ABSTRACT

In a mail sending apparatus, an attached file generation unit generates an attached file in which an access method for a designated file is described. A mail tool attaches the attached file to a mail message to form mail data, and transmits it to a designated destination through a mail server. In a mail receiving apparatus, a mail reader extracts the attached file from the mail data received through a mail server. An attached file analysis unit analyzes the access method described in the attached file. A file reception unit accesses a file management/transmission tool in accordance with the access method to receive and display the designated file.

41 Claims, 19 Drawing Sheets

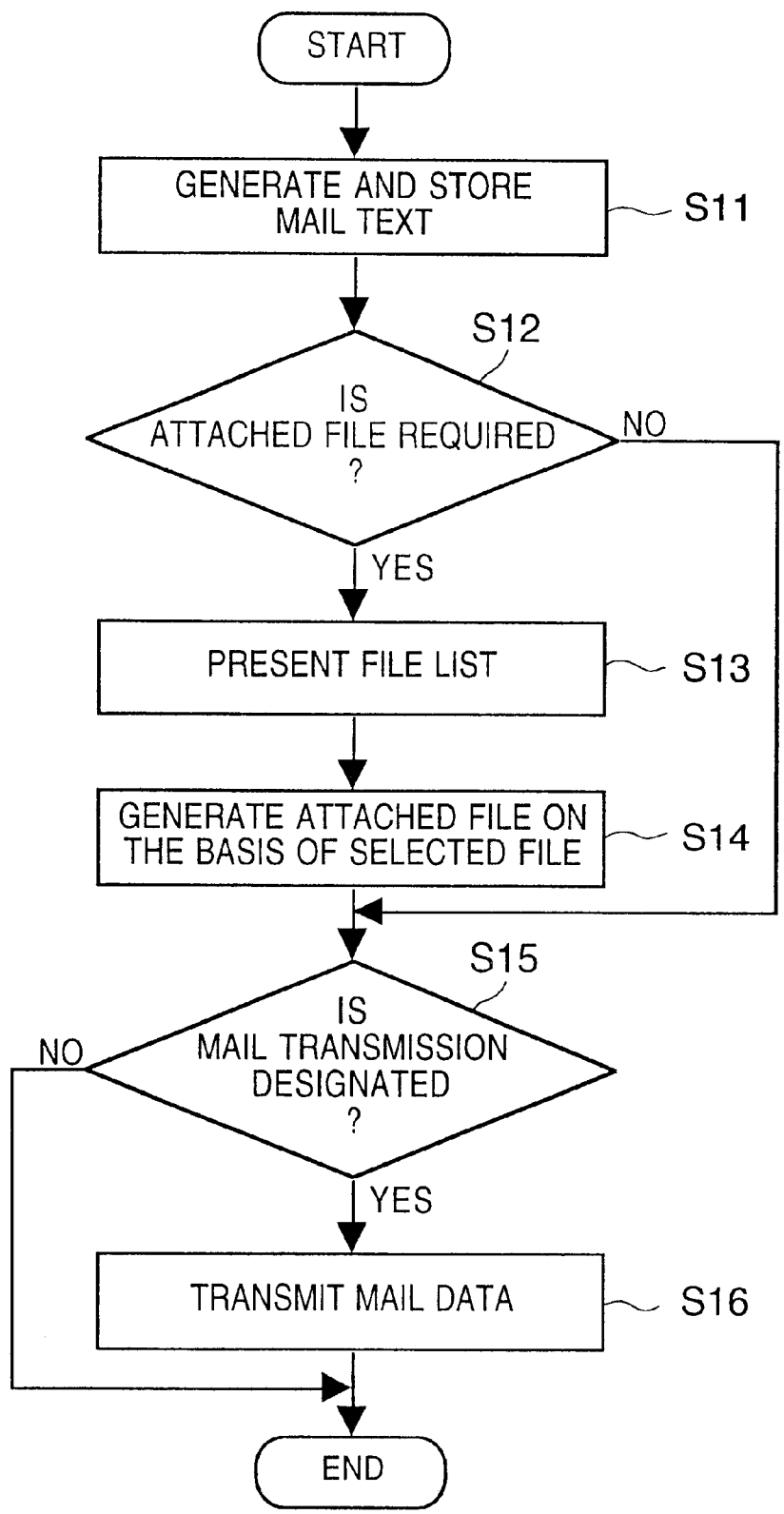

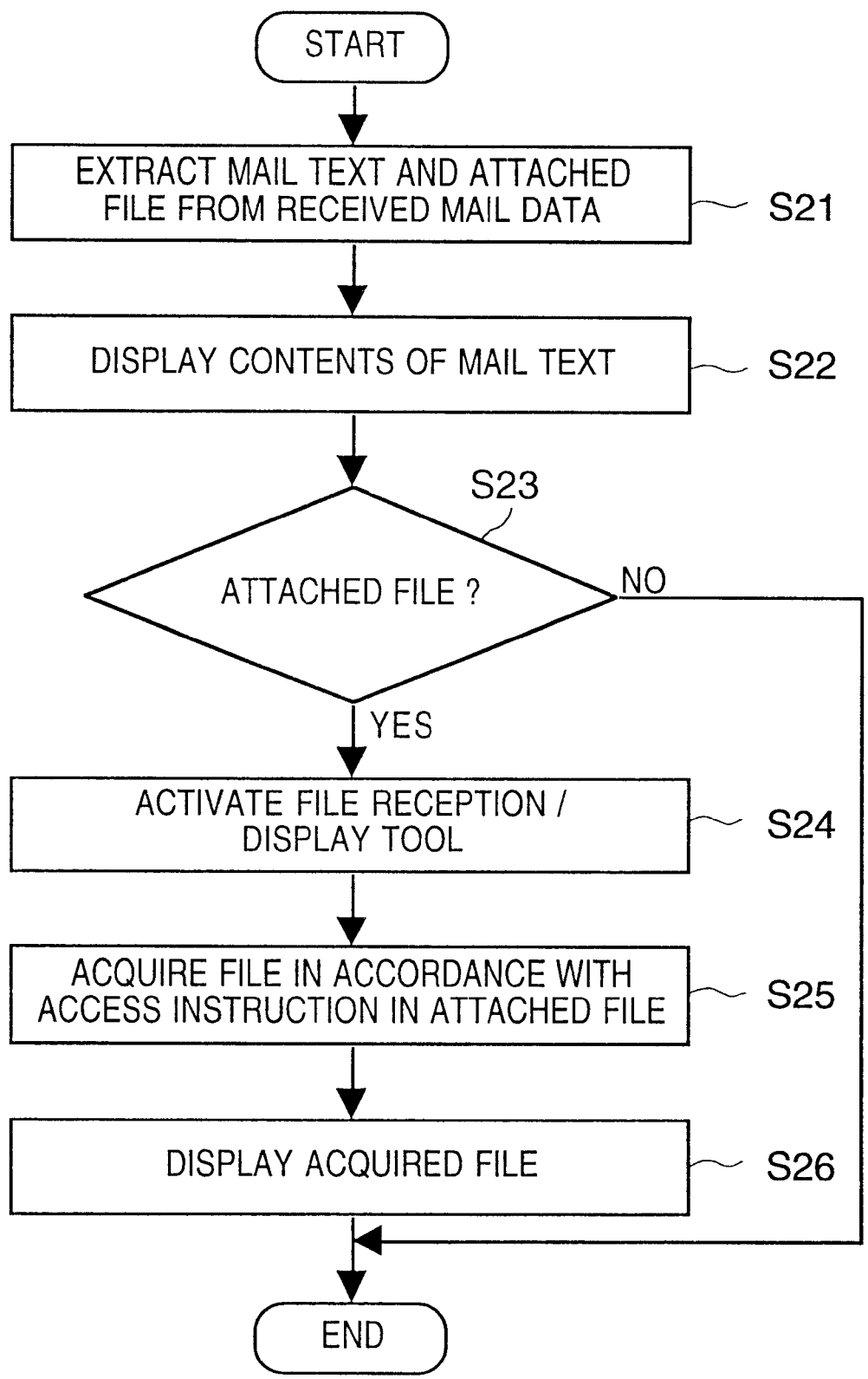

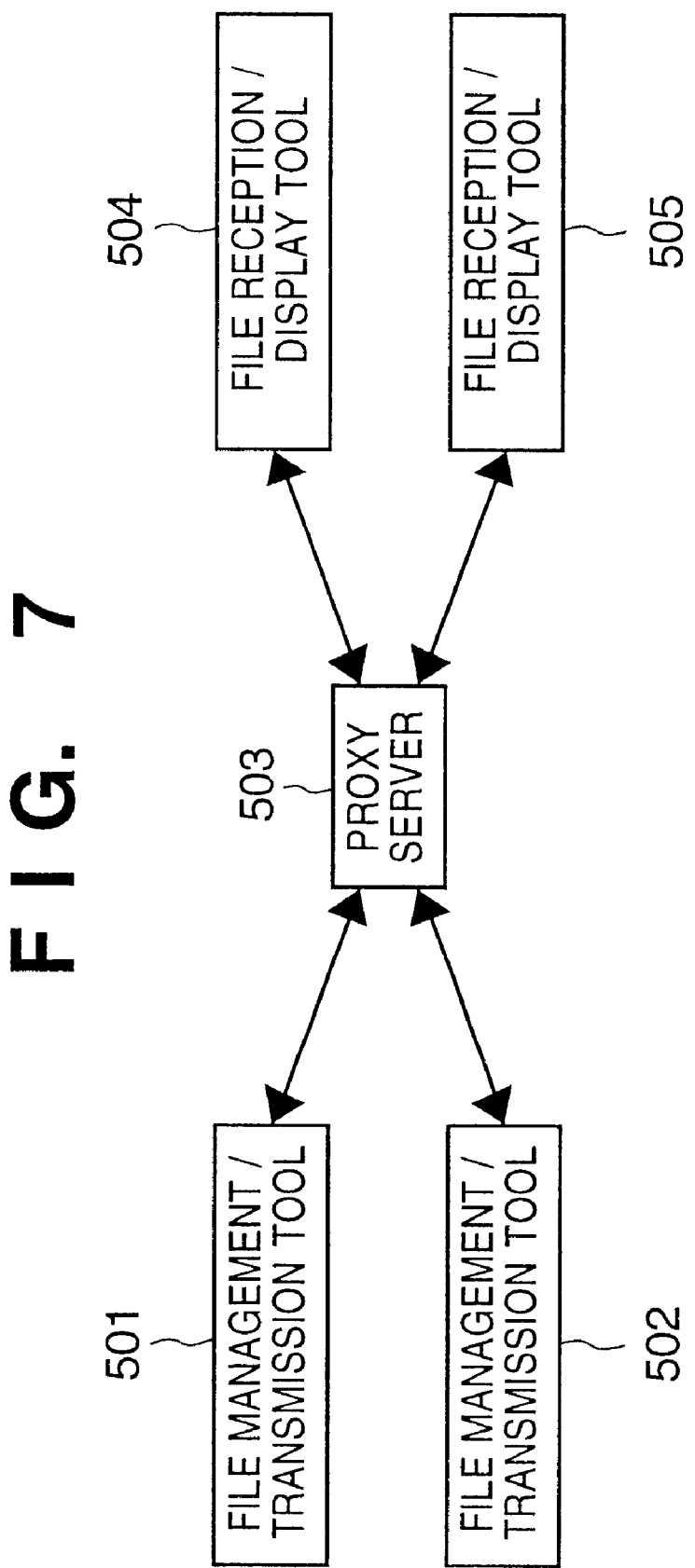

MATERIAL 1 proxy ://host3/ http://host1/dir1/file1.html
MATERIAL 2 proxy ://host3/ ftp://host2/pub/dir2/file2.gz 601
602

| FILE | MAIL SENDER | FILE RECEIVER | RECEIVER CONFIRMATION | |
|---|---|---|---|---|
| fileA. txt | sawada | tokuko | NO | |
| fileB. txt | chama | baba | 96 / 12 / 25 | ~1001 |

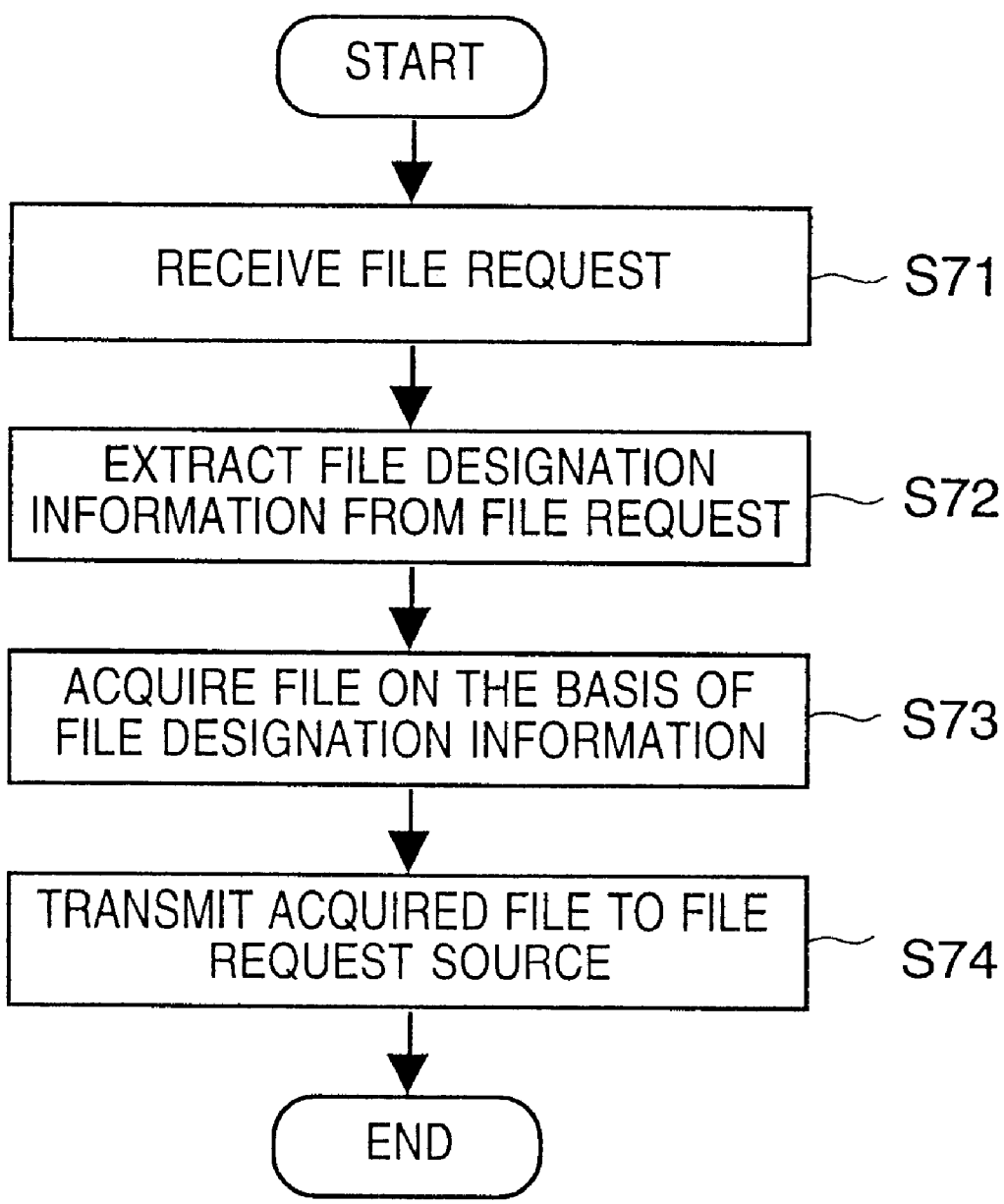

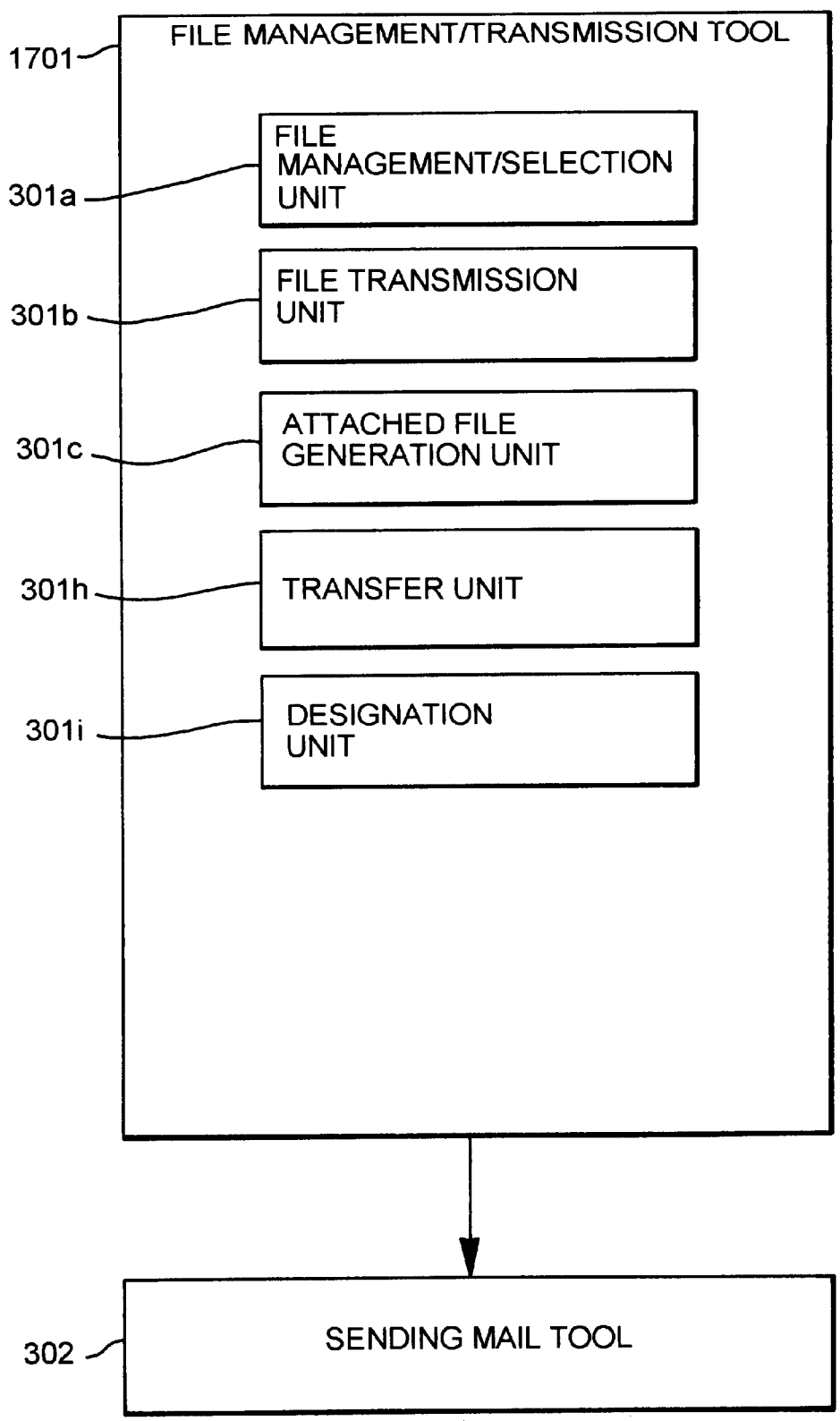

INFORMATION PROCESSING SYSTEM CAPABLE OF FILE TRANSMISSION AND INFORMATION PROCESSING APPARATUS IN THE SYSTEM

BACKGROUND OF THE INVENTION

1. Field of the Invention

The present invention relates to an information processing system capable of transmitting files between computers in a network environment in which a plurality of computers are linked with each other, an information processing apparatus in the system, and a method of controlling the system and the apparatus.

2. Related Background Art

FIG. 1 is a view for explaining a file transmission method using general electronic mail. In a general mail transmitting operation in which no file is transmitted, the mail sender generates a mail message by using a mail tool 102, designates a receiver, and transmits the message to the receiver. A sending mail server 103 receives the message transmitted from the mail tool 102, and sends the message to a receiving mail server 104. The sending mail server 103 and the receiving mail server 104 are linked with each other by a mail transfer protocol such as SMTP (Simple Mail Transfer Protocol) on a computer network. A mail message is transferred in accordance with the protocol.

The receiver can extract mail addressed to the receiver by the receiving mail server 104 and check the contents of the mail by using a mail reader 105.

When a file is to be transmitted together with a message, the sender generates the message by using the mail tool 102 as in the above case. The sender then selects the file to be transmitted, merges it into the mail message, and transmits the message from the sending mail server 103.

When, for example, SMTP, which is a standard electronic protocol in the Internet, is to be used, the mail tool 102 generates a message called a multipart, which is constituted by a plurality of divided message portions, by using Multipart/Mixed type as Content-Type in the MIME (Multipurpose Internet Mail Extension) standards. The sending mail server 103 then transmits the divided message portions (multipart).

In this case, an attached file is one part of the multipart, and a file format can be designated as Content-Type for the part in the form of text/html or the like. Files of various formats can therefore be merged into a mail message and transmitted. The receiver can extract the attached file from the received mail by using the mail reader 105, and store the file in a disk. Then, the file can be displayed and edited by using various tools.

In general, the mail reader 105 holds a table indicating correspondence between Content-Types indicating the formats of attached files and tools for processing the files of the respective formats, and automatically activates a corresponding tool in accordance with operation performed by the receiver. For example, the mail receiver can set this table to activate a text editor for a text/pain file; a WWW (World Wide Web) browser for a text/html file; and the wordprocessor software "Word" (tradename) available from Microsoft for an application/msword file. With this setting, the contents of an attached file can be easily checked.

In addition, in a file transmitting operation using an "attached file", a file can be transmitted by "file reference" using electronic mail. According to the MIME standards, a transmission target file can be handled as external data, and the location of the file and a reference method for the file can be described in a mail message by setting Content-Type of mail header information as Message/External-Body type, instead of directly merging the contents of the file into the mail message.

In this case, the transmission target file is not transmitted as a mail message, but the receiving side will receive the target file by outputting a file transmission request by using another means in accordance with the location of the file and the reference method described in the mail message.

A file management/transmission unit 101 in FIG. 1 includes a file management unit (file system) for managing transmission target files and a file transmission unit for transmitting a file in response to an external file transmission request. Each file referred to as a transmission target is managed by this file management unit. The receiver uses the mail reader 105 to activate a file reception/display unit 106 in accordance with the location of the file and the reference method described in the mail message. The file reception/display unit 106 outputs a file transmission request to the file management/transmission unit 101, which is mounted in the computer to manage the file, on the basis of the location of the file described in the mail message, receives the contents of the file, and displays the contents.

Standard file transfer protocols such as FTP (File Transfer Protocol) and HTTP (Hyper Text Transfer Protocol) are used between the file reception/display unit 106 and the file management/transmission unit 101. The use of a specific protocol for file transfer is designated as a file reference method in the mail message, and the corresponding file reception/display unit 106 can be automatically activated by the mail reader.

The following problems, however, are posed in the above "attached file" type file transmission.

1) The problems posed when a file with a large size is to be transmitted or a file is to be transmitted to many receivers are:

1-1. A heavy load is imposed on the network resources between computers.

1-2. A heavy load is also imposed on the computer resources on the sending side.

1-3. Attached files having the same contents are one-sidedly distributed to receivers, and the management of transmitted files depends on each receiver.

2) When the contents of an attached file are based on a file format depending on a specific tool, an environment that allows the tool to operate must be prepared or the file must be re-transferred to the tool operation environment, resulting in a heavy load imposed on the receiver.

Furthermore, the following problems are posed in the above "file reference" type file transmission.

3) A method of describing a reference method for an external file is limited to a standard method. That is, some restriction is imposed on the users.

4) Mail readers capable of accurately analyzing a file reference description method and activating the file reception/display unit 106 are not so popular.

SUMMARY OF THE INVENTION

The present invention has been made in consideration of the above problems, and has as its object to provide an information processing system, an information processing apparatus, and an information processing method which reduce loads imposed on computer resources, computer network resources, and users in file transmission using electronic mail.

It is another object to implement various extension functions and applications that are not implementable in the prior art in which a file itself is added to a mail message, thereby effectively using electronic mail.

It is another object of the present invention to obviate the necessity to expand and modify the electronic mail system itself, and to achieve the above objects while solving the problem of interconnection characteristics to which the utmost importance is attached in the electronic mail system.

It is still another object of the present invention to achieve the above objects by attaching a file in which an access method for a file is described, instead of attaching a file, analyzing the access method on the receiving apparatus side, and acquiring the file.

It is still another object of the present invention to perform file transmission/reception more efficiently by using a proxy server for file transmission/reception in accordance with the above attached file.

It is still another object of the present invention to allow a check on the validity of a file acquired in accordance with the access method described in an attached file by describing file attribute information in the attached file, thereby improving the reliability of file transmission.

It is still another object of the present invention to allow a file transmission record to be held and perform proper file transmission management.

It is still another object of the present invention to allow registration of destinations to which each file can be transmitted so as to improve the security in file transmission.

According to one aspect of the present invention, in order to achieve the above objects, an information processing system having the following arrangement is provided.

There is provided an information processing system capable of transmitting a file on a network, comprising:
  generation means for, in generating mail data, generating an attached file in which an access method for a designated file is described;
  communication means for transmitting/receiving, through the network, the mail data to which the attached file generated by the generation means is attached;
  extraction means for extracting the attached file from the received mail data; and
  acquisition means for acquiring the designated file through the network in accordance with the access method described in the attached file extracted by the extraction means.

According to another aspect of the present invention, an information processing apparatus used in the above information processing system is provided.

According to still another aspect of the present invention, a control method executed by the above information processing system or apparatus is provided.

According to still another aspect of the present invention, a computer readable memory storing control programs for implementing the above control method is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flow chart for explaining a control sequence on the mail sending side according to the first embodiment;

FIG. 6 is a flow chart for explaining a control sequence on the mail receiving side according to the first embodiment;

FIG. 7 is a block diagram conceptually showing the connection form between a file management/transmission tool and a file reception/display tool according to the second embodiment;

FIG. 21 is a flow chart for explaining file transmission processing in the first embodiment.

FIG. 22 is a block diagram showing the functional arrangement of a file management/transmission tool 1701 according to the sixth embodiment.

DETAILED DESCRIPTION OF THE PREFERRED EMBODIMENTS

Preferred embodiments of the present invention will now be described in detail in accordance with the accompanying drawings.

First Embodiment

Figure 1:
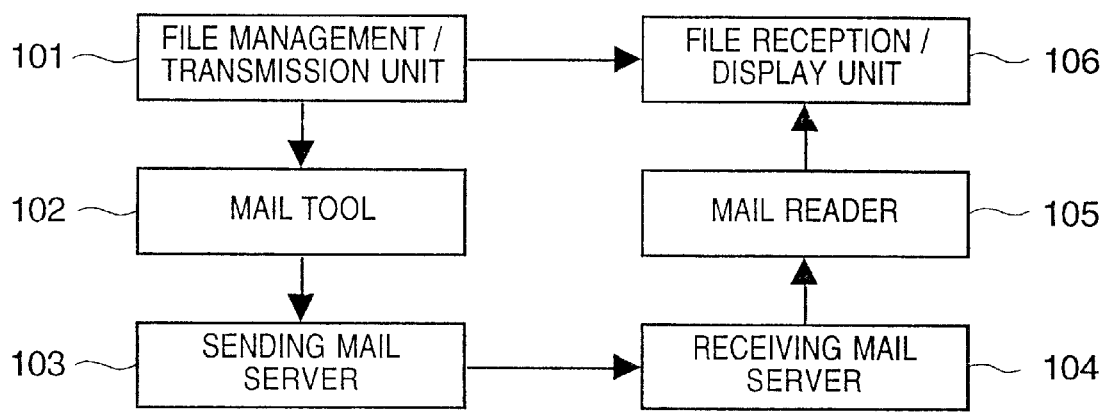
FIG. 1 is a block diagram for explaining a file transmission method using general electronic mail.
Figure 2:
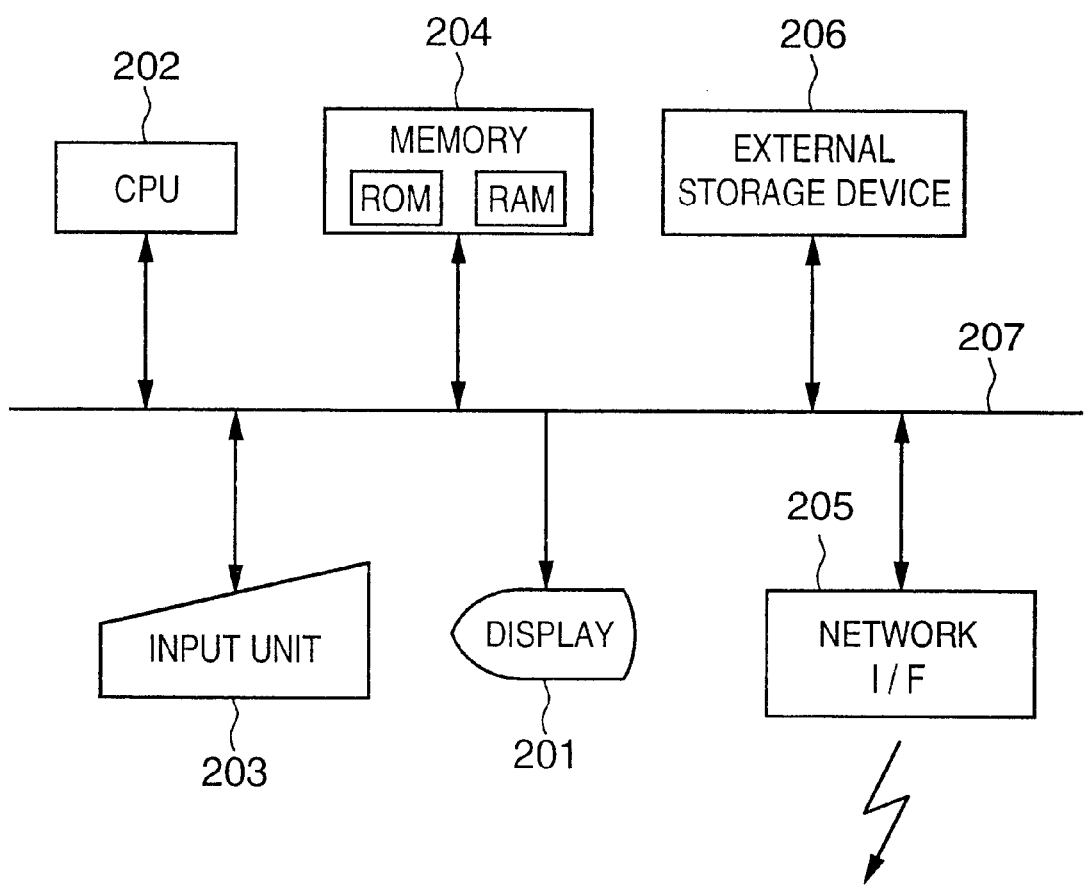
FIG. 2 is a block diagram showing the arrangement of an information processing apparatus according to an embodiment of the present invention.

FIG. 2 is a block diagram showing the arrangement of an information processing apparatus according to the first embodiment. Referring to FIG. 2, reference numeral 202 denotes a CPU, which implements various control operations by executing the control programs stored in a memory 204. For example, the CPU 202 implements a mail tool, a file management system, and a network service (to be described later). The memory 204 is constituted by a ROM, a RAM, and the like. Various control programs, temporary data generated in the process of executing the programs, and the like are stored in the RAM in the memory 204. Reference numeral 205 denotes a network interface, which is hardware for connection to an external computer through a network.

Reference numeral 201 denotes a display for performing various displays such as the mail tool to be used by the user; and 203, an input unit including a keyboard and a pointing device such as a mouse. The user transmits/receives mail to/from an arbitrary user by using the input unit 203 and the tools (the mail tool, the file management system, the network service, and the like) displayed on the screen of the display 201.

Figure 3:
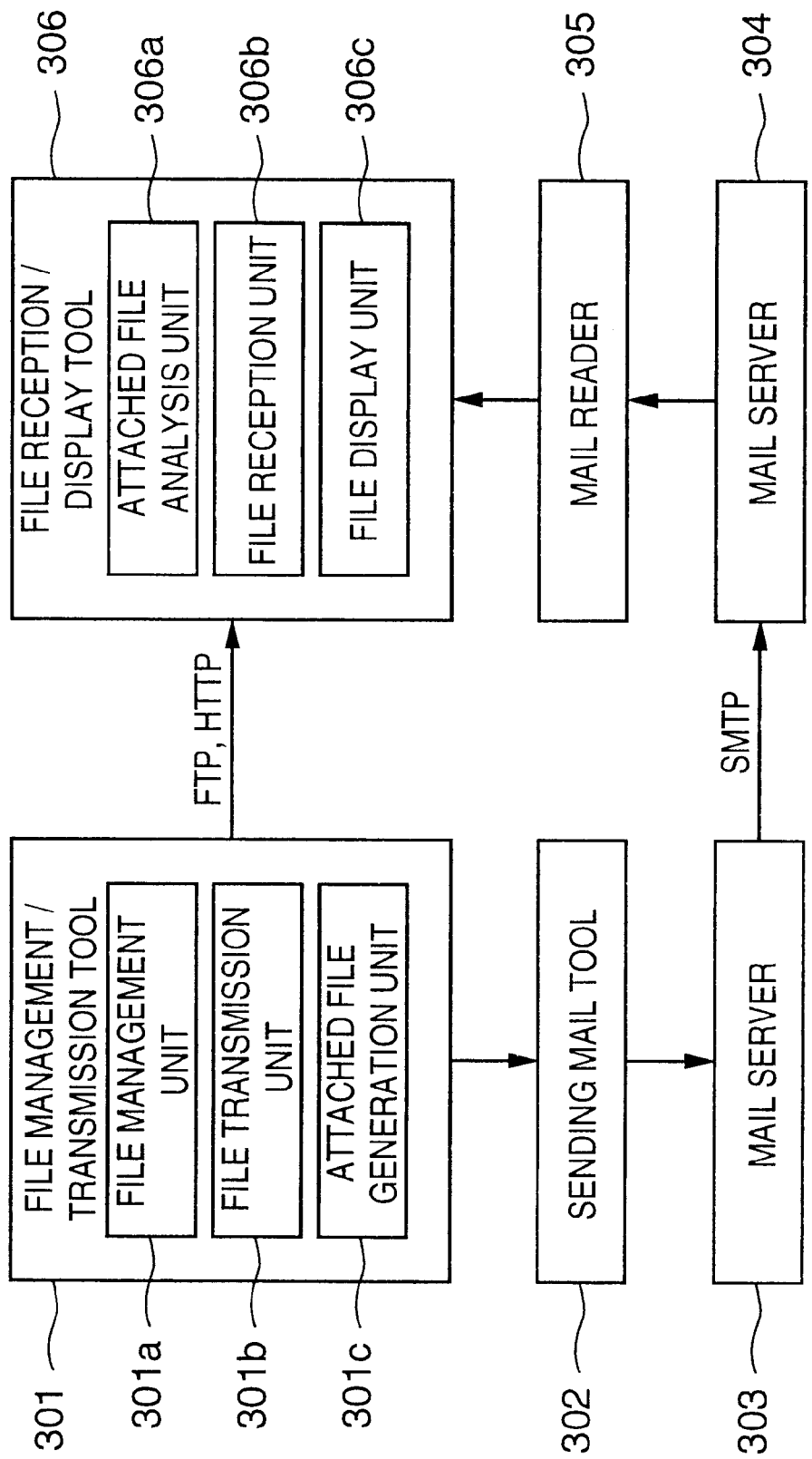
FIG. 3 is a block diagram showing the functional arrangement of an information processing system according to the first embodiment.
Figure 4A:
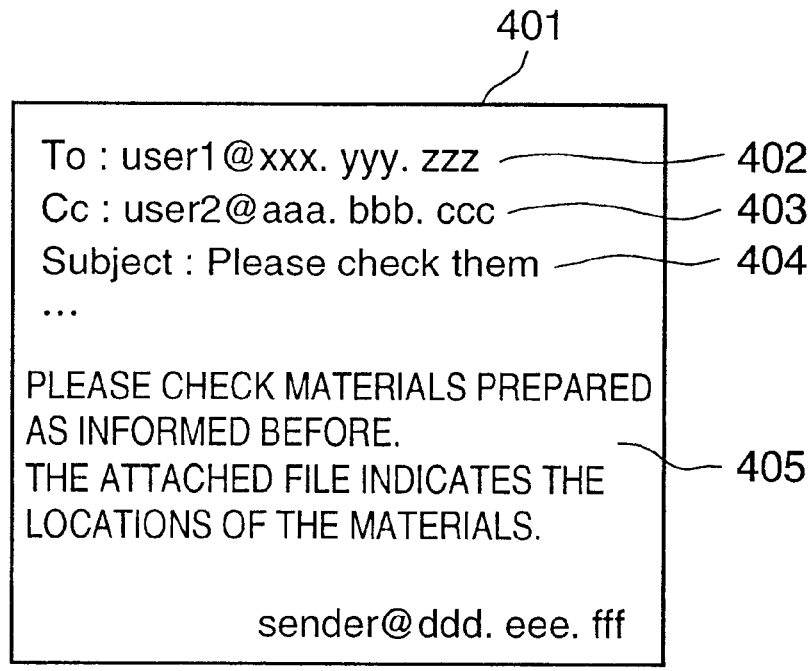
FIGS. 4A and 4B are views respectively showing examples of a mail message and an attached file which are to be generated.
Figure 4B:
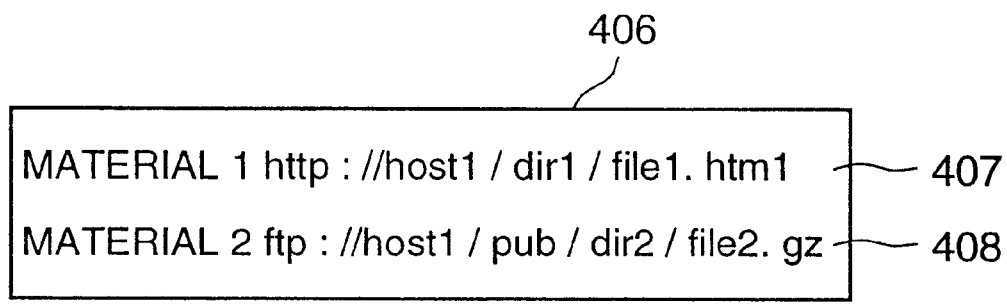

FIG. 3 is a block diagram showing the functional arrangement of the information processing system according to the first embodiment. FIG. 4A shows a mail message to be generated. FIG. 4B shows an example of an attached file. A file transmission method according to the first embodiment will be described below with reference to FIGS. 3, 4A, and 4B.

Referring to FIG. 3, reference numeral 301 denotes a file management/transmission tool for managing files to be transmitted and transmitting the contents of a file in accordance with a transmission request. In the file management/transmission tool 301, a file management unit 301a is a general file system for managing various transmission files and the like. An ftp server and an http server are set in a transmission unit 301b. All the files to be transmitted are arranged under the control of these servers to allow external computers to access the files. An attached file generation unit 301c has the function of generating an attached file. This function will be described in detail later.

Reference numeral 302 denotes a mail tool (SMTP client) used by a sender to generate and transmit a mail message. FIG. 4A shows an example of a mail message to be generated. First of all, the sender generates destinations 402 and 403, a title 404, and a text 405 by using the mail tool 302. The sender then selects a file as a transmission target from the files managed by the file management unit 301a, and generates an attached file 406 in FIG. 4B by using the attached file generation unit 301c.

In this attached file 406, the location of each file as a transmission target, i.e., the computer name and the path name in the computer, and a file transfer method are described. Referring to FIG. 4B, the locations of two transmission target files (407 and 408) and the access methods are described in the text format in accordance with a URL.

The sender merges the attached file 406 generated in this manner, in which the access methods for the transmission target files are described, into a mail message 401.

Referring to FIG. 3, reference numerals 303 and 304 denote mail transfer (SMTP) servers for transferring messages, in accordance with SMTP, through a network that links the sender with the receiver; and 305, a mail reader used by the receiver to read the mail addressed to the receiver, check the contents, and extract the attached file. As in the prior art, the mail reader 305 can automatically activate a tool for processing the attached file in accordance with the Content-Type indicating the format of the attached file. If, therefore, application/x-fileref is set as the Content-Type of the attached file generated by the attached file generation unit 301c, and a file reception/display tool 306 is registered as a corresponding processing tool, the tool is automatically activated.

The file reception/display tool 306 analyzes the attached file 406 extracted by the mail reader 305 by using an attached file analysis unit 306a. A file reception unit 306b accesses the file management/transmission tool 301 in accordance with the access methods described in the attached file 406 to receive the designated files. A file display unit 306c displays the files received in this manner to the receiver.

For a simpler operation, the file reception/display tool 306 may only activate other file reception/display tools in accordance with the described access methods. If, for example, the file transfer methods described in the attached file 406 are HTTP and FTP, a WWW browser capable of executing both the methods may only be activated to transfer the URLs of the target files extracted from the attached file 406.

The contents of the above processing will be further described in accordance with the flow charts of FIGS. 5 and 6. FIG. 5 is a flow chart for explaining a control sequence on the mail sending in the first embodiment. FIG. 6 is a flow chart for explaining a control sequence on the mail receiving side in the first embodiment.

In step S11, the user on the mail sending side generates a mail text (e.g., the mail message 401 in FIG. 4A) by using the mail tool 302, and stores it in the RAM in the memory 204. If the user inputs information indicating the necessity of an attached file, the attached file generation unit 301c is activated. The flow then advances from step S12 to step S13. In step S13, a list of files managed by the file management unit 301a is presented to make the user select a file to be attached. When the file to be attached is selected, an attached file (e.g., the attached file 406 in step S4B) is automatically generated on the basis of the selected file in step S14. The attached file is then merged into the mail text. In response to a mail transmission command, the flow advances from step S15 to step S16 to transmit the mail data (the mail text and the attached file). If it is determined in step S12 that no attached file is necessary, the flow advances to step S15 to transmit the mail data (only the mail text in this case).

When the mail is received on the mail receiving side, the mail reader 305 extracts the mail text and the attached file from the received mail data in step S21. In step S22, the contents of the mail text are displayed. In step S23, it is checked whether the mail contains any attached file. If YES in step S23, the corresponding file reception/display tool (e.g., the file reception/display tool 306 in FIG. 3) is activated in accordance with the Content-Type described in the attached file (step S24). First of all, the activated file reception/display tool analyzes the access method described in the attached file by using the attached file analysis unit 306a. The file reception unit 306b then makes an access for file acquisition on the basis of the analysis result to acquire the necessary file (step S25). In step S26, the file display unit 306c displays the file acquired by the file reception unit 306b. If a plurality of files are designated, as in the case in FIG. 4B, the respective files are sequentially acquired.

Note that when the mail reader 305 on the receiving displays the mail text in step S22, the user on the receiving may be inquired whether to acquire and display the attached file.

FIG. 21 is a flow chart for explaining a sequence of file transmission processing performed by the file management/transmission tool 301 in the first embodiment. When the file reception/display tool 306 issues a file request in accordance with the attached file in step S25, the file management/transmission tool 301 receives this request (step S71). File designation information indicating the location of the file is extracted from the received file request, and the requested file is searched out and acquired on the basis of the file designation information (steps S72 and S73). The acquired file is then transmitted to the file request source (step S74).

Second Embodiment

In the first embodiment described above, every time an activation request for the file reception/display tool 306 is received, the mail receiver must directly access the servers on the file management/transmission tool 301. For this reason, when many access requests for the servers are made by many users, large loads are imposed on the computer in which the servers operate and the network that links the computer with the request source computers. Furthermore, the response speed decreases.

In contrast to this, according to the second embodiment, a proxy server for the servers (the file transmission servers; the ftp server and the http server in the first embodiment) that operate on the file management/transmission tool 301 is added between the file management/transmission tool 301 and the file reception/display tool 306, and transmission file data is cached on the proxy server. Information indicating the use of the proxy server can be additionally described in the file transfer methods described in the attached file 601, thereby distributing/reducing the loads imposed on the file management/transmission tool 301 and the network resources for linking the file management/transmission tool 301 to other tools.

Figure 8:
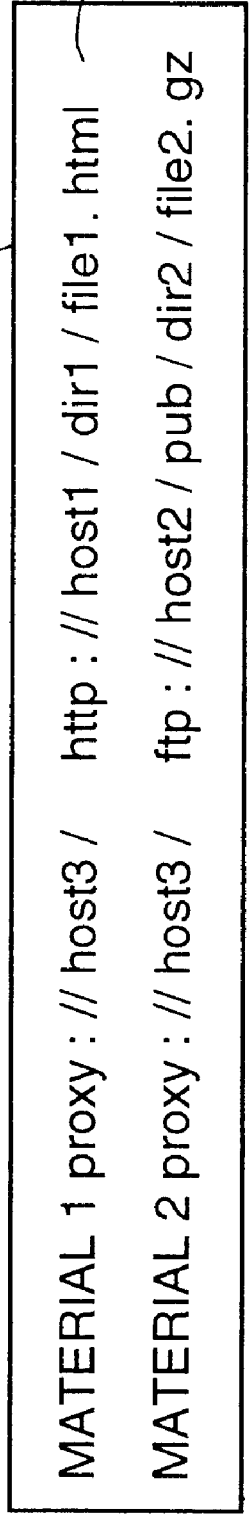
FIG. 8 is a view showing an example of a description in an attached file according to the second embodiment.

The second embodiment will be described below with reference to FIGS. 7 and 8. FIG. 7 conceptually shows the connection form between file management/transmission tools and file reception/display tools in the second embodiment. An illustration of the mail tools and mail servers on the sending and receiving sides like those shown in FIG. 3 is omitted from FIG. 7. FIG. 8 shows an example of a description in an attached file according to the second embodiment.

Referring to FIG. 7, reference numerals 501 and 502 denote file management/transmission tools, each of which is identical to the file management/transmission tool 301 in the first embodiment; and 504 and 505, file reception/display tools, each of which is identical to the file reception/display tool 306 in the first embodiment. The file reception/display tools 503 and 504 respectively request the file management/transmission tools 501 and 502 to transmit files.

Reference numeral 503 denotes a proxy server for file transmission servers that operate in the file management/transmission tools 501 and 502. The proxy server 503 relays file transmission requests from the file reception/display tools 504 and 505 to the file management/transmission tools 501 and 502. The proxy server 503 can receive file transmission requests, distribute the transmission requests to the proper transmission servers, receive results (file data) from the transmission servers, and return the results to the request sources. The proxy server 503 also has a cache function to cache a file for which a transmission request was received in the past. Therefore, upon reception of a transmission request for a file identical to a file for which a transmission request was received in the past, the proxy server 503 does not transfer the request to the transmission server, but returns the data in the cache to the request source. Note that a known method such as LUR (least recently used) can be used to manage cache data in the proxy server 503.

FIG. 8 shows examples of the file transfer methods described in the attached file 601. The mail sender describes a condition that the mail receiver should output a reception request for a transmission file through the proxy server 503.

For example, a text line 602 in the attached file includes "http://host1/dir1/file1.html" to access a file corresponding to material 1, and "proxy:/host3/" indicates that access to the file is gained through the proxy server 503.

Upon reception of this attached file, the apparatus on the mail receiving side outputs a file transmission request to the proxy server 503 in accordance with the content of the attache file, and receives the file intended by the mail sender. The file transmission is then complete.

In the second embodiment, when a file transmission request is received from the apparatus on the mail receiving side, and the corresponding transmission file data is not present in the cache in the proxy server 503, access must be made to the transmission server. To further reduce the number of such accesses, the file management/transmission tools 501 and 502 or a mail tool on the sending side (the mail tool 302 in FIG. 3) may transfer a transmission target file to the cache in the proxy server 503, i.e., may perform "advance transmission of file". This arrangement can further reduce the loads imposed on the computer in which the transmission servers operate and the network resources linked with the computer when requests are generated by the file reception/display tools 504 and 505.

When this "advance transmission of file" is to be performed, the proxy server 503 can check whether the target file has already been cached. The file write-back may be performed only when the file has not been cached.

Third Embodiment

In the first embodiment, the file management/transmission tool 301 transmits a file in response to a request from the file reception/display tool 306. In this case, no check is made as to whether the contents of the transmission file requested by the mail receiver coincide with the contents of the file intended by the mail sender at the time of transmission.

Figure 10:
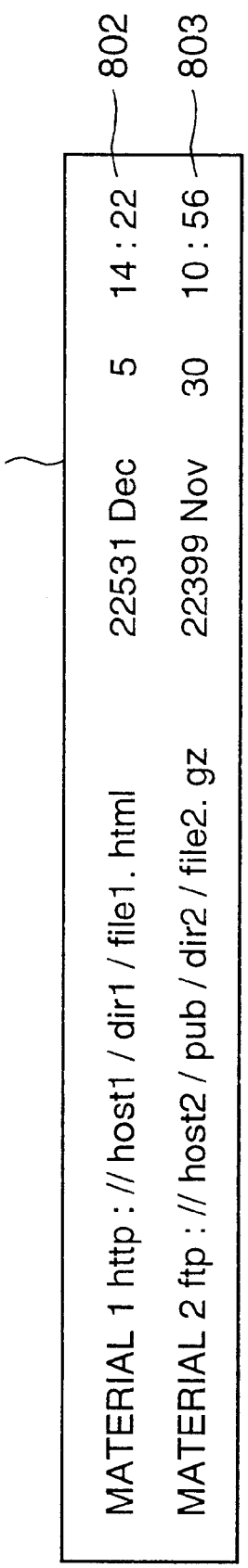
FIG. 10 is a view showing an example of a description in an attached file according to the third embodiment.

In the third embodiment, as shown in FIG. 10, pieces of check information (file sizes and file update dates) for uniquely identifying the respective transmission files intended by the mail sender are additionally written in an attached file, and the attached file is transmitted.

Figure 9:
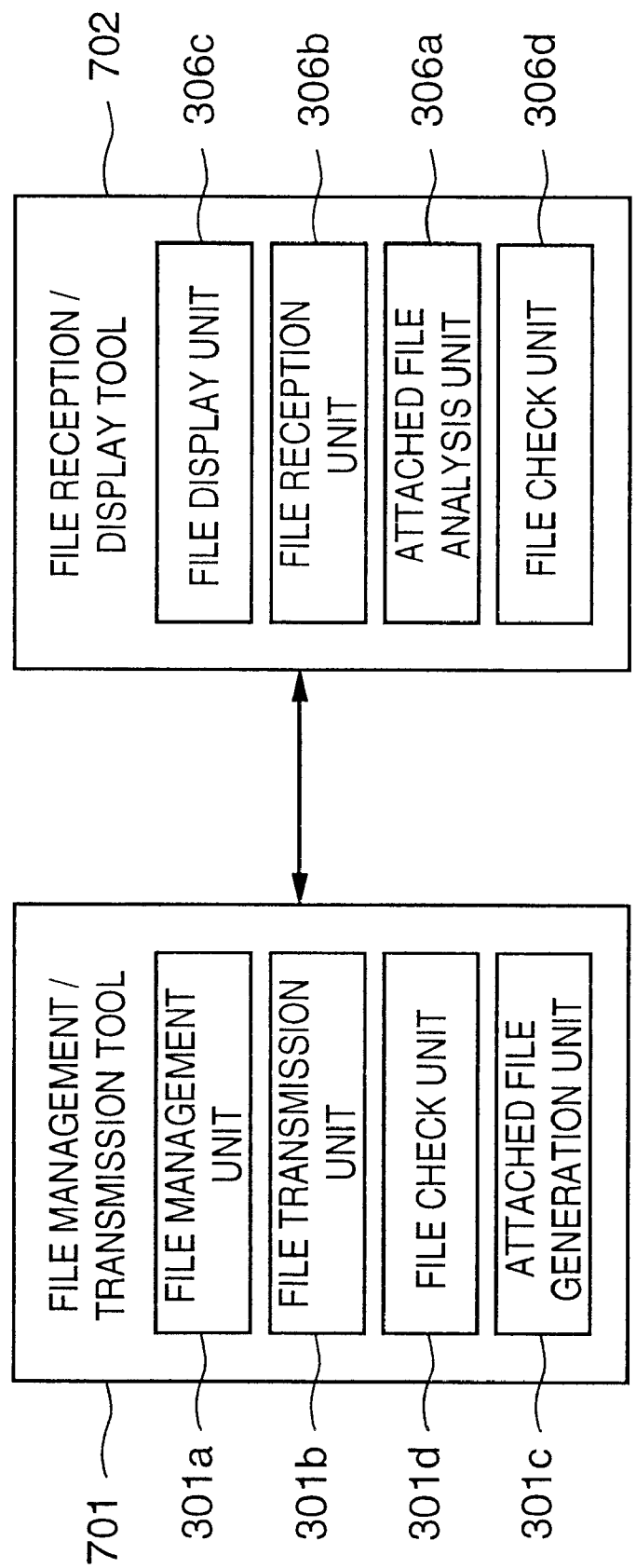
FIG. 9 is a block diagram showing the functional arrangements of a file management/transmission tool and a file reception/display tool according to the third embodiment.

FIG. 9 is a block diagram showing the functional arrangements of a file management/transmission tool and a file reception/display tool according to the third embodiment. Note that the remaining functional arrangements that are not shown in FIG. 9 are the same as those in FIG. 3. In the third embodiment, file check units 301d and 306d are respectively added to the file management/transmission tool and the file reception/display tool. The file check units 301d and 306d perform file matching on the basis of the above pieces of check information written in the attached file. With this check mechanism, accurate file transmission is realized.

FIG. 10 shows an example of a description of an attached file according to the third embodiment. As described above, in an attached file 801 according to this embodiment, the sizes and final update dates of the respective transmission target files (802 and 803) are described as pieces of check information in addition to a description of file reference methods. Note that a sequence of merging the attached file is the same as that described with reference to FIG. 5.

Figure 11:
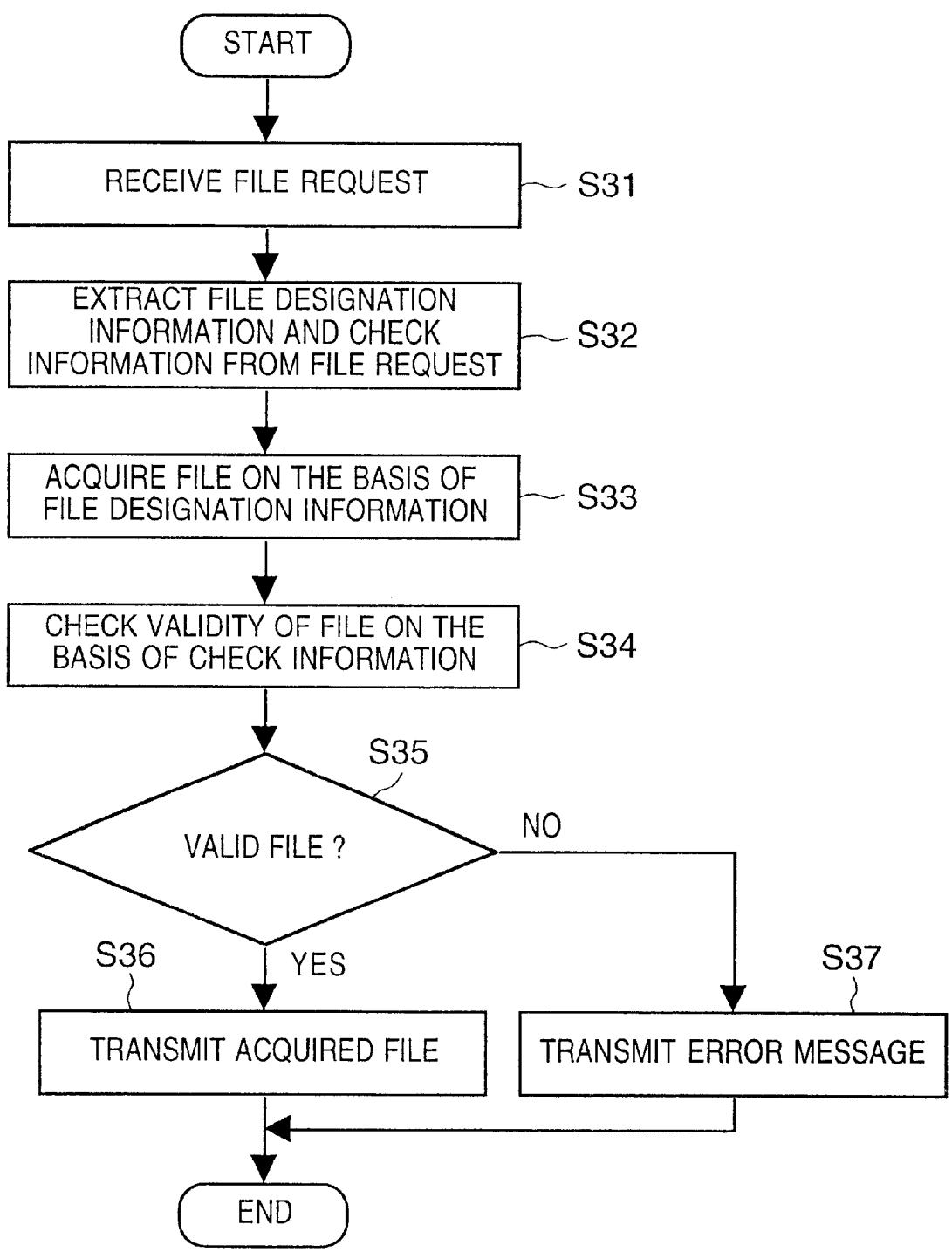
FIG. 11 is a flow chart for explaining a file check sequence according to the third embodiment.

FIG. 11 is a flow chart for explaining a file check sequence according to the third embodiment. The operation of the third embodiment will be described below with reference to FIG. 11.

The file check unit (306d) on the file reception/display tool 702 side extracts the access method and check information of a transmission target file from the contents described in the received attached file. The file reception/display tool 702 outputs a file transmission request and a check request to a file management/transmission tool 701 on the basis of these data. The above processing on the file reception/display tool 702 side is performed in step S25 in FIG. 6.

Upon reception of the file request (step S31), the file management/transmission tool 701 extracts file designation information and check information from the file request (step S32). In step S33, a file transmission unit 301b acquires the file designated by the above designation information through a file management unit 301a, as in the first embodiment. In step S34, the file check unit 301d performs file matching on the basis of the check information before the transmission unit 301b actually transmits the acquired file. If it is determined that the two files coincide with each other, the file is transmitted (steps S35 and S36). If it is determined that the two files differ from each other, error information is transmitted to a file reception unit 306b of the file reception/display tool 702 as the request source through the transmission unit 301b (steps S35 and S37).

Note that check information described in an attached file is not limited to the above information in the third embodiment. For example, a check sum value or a hash value such as MD2 (reference: RFC1319) or MD5 (RFC1321) of a transmission file can be calculated and used.

If the file management unit 301a can perform history management of each file, version information about each file can be added as check information.

Fourth Embodiment

In the first embodiment, since no reception record indicating "who has received which file" is left, there is no way to check whether file transmission has been complete as intended by the mail sender. In the fourth embodiment, a file management/transmission tool can hold a file transmission record.

Figure 12:
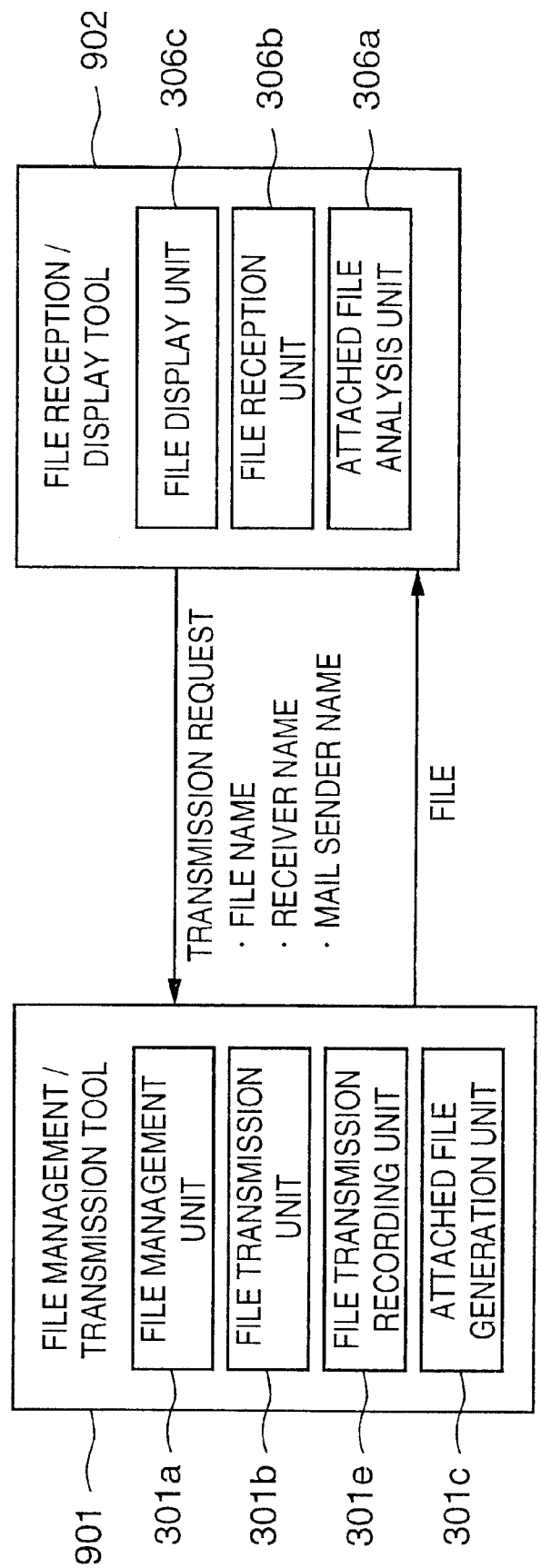
FIG. 12 is a block diagram showing the functional arrangements of a file management/transmission tool and a file reception/display tool according to the fourth embodiment.

FIG. 12 shows the functional arrangements of a file management/transmission tool and a file reception/display tool according to the fourth embodiment. As shown in FIG. 12, the fourth embodiment includes a file transmission recording unit 301e to make a record of the file transmission performed in response to a request from a file reception/display tool 902 or the like. The data in the file transmission recording unit 301e can be referred to. The mail sender checks the transmission state of the tool recorded on this transmission record to determine whether the mail receiver has completed file reception.

Figures 13, 14:
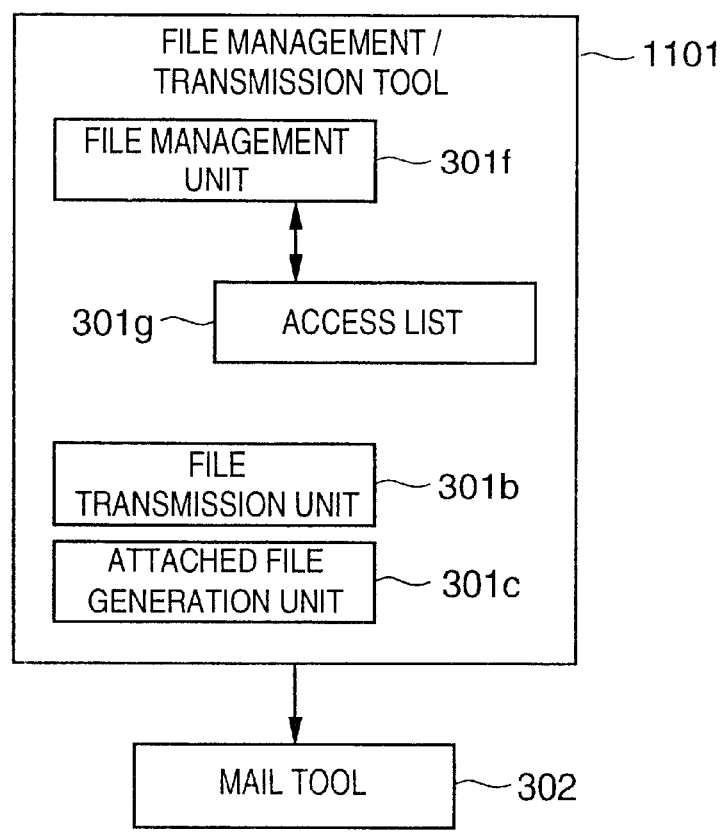
FIG. 13 is a view showing an example of a transmission record according to the fourth embodiment.
FIG. 14 is a block diagram for explaining the functional arrangement of a file management/transmission tool according to the fifth embodiment.

FIG. 13 shows an example of a transmission record in the fourth embodiment. As shown in FIG. 13, four fields, namely a transmission file name, a mail sender, a file receiver, and receiver confirmation, are recorded as one entry. For example, an entry 1001 indicates that the mail sender "chama" has sent a reception request mail for the file "fileB.txt" to the mail receiver "baba", and baba has completed file reception on Dec. 25, 1996.

The operation of the fourth embodiment will be described below.

The sequence of processing on the file sending is almost the same as that shown in the flow chart of FIG. 5 except that the following processing is added in step S14. More specifically, upon generating an attached file, an attached file generation unit 301c causes the file transmission recording unit 301e to ensure an entry for the transmission file designated by the mail sender. At this time, the transmission file name, the mail sender name, and the file receiver name are recorded in the entry corresponding to the transmission file, and "no" is set in the receiver confirmation.

The sequence of processing on the mail receiving side is almost the same as that shown in the flow chart of FIG. 6. That is, the mail receiver outputs a file transmission request by using the file reception/display tool 902. In this case, however, this transmission request includes transmission request source user information (indicating the mail receiver as well as the receiver of the transmission file) and the mail sender information (mail sender name), together with the transmission target file name.

Upon reception of the transmission request, a transmission unit 301b transmits the transmission target file. Upon completion of the file transmission, the transmission unit 301b transfers the transmission file name, the mail sender information, the transmission file receiver information, and the transmission completion date to the file transmission recording unit 301e.

The file transmission recording unit 301e searches the transmission record information shown in FIG. 13 for an entry coinciding with a combination of the file name, mail sender information, and file receiver information of the record data transferred from the transmission unit 301b, and sets the file transmission completion date in the receiver confirmation field of the entry.

In the above arrangement, the mail sender can check the state of file transmission by referring to the data in the file transmission recording unit 301e, as needed.

The transmission unit 301b can be designed to reject transmission when transmission record information includes no entry corresponding to a combination of a file name corresponding to a transmission request, mail sender information, and a file receiver information. With this arrangement, security against file access can be improved. In addition, file transmission can be stopped by deleting a specific entry from this file transmission record.

Fifth Embodiment

The fifth embodiment includes an access list as a list of users who can access each transmission target file (user information) in a file management unit. Mail destinations are determined by referring to this access list.

FIG. 14 is a block diagram for explaining the functional arrangement of a file management/transmission tool 1101. An illustration of the functional arrangement on the file receiving side and the mail server is omitted from FIG. 14. Referring to FIG. 14, reference numeral 301f denotes a file management unit for storing and managing transmission target files; and 301g, an access list in which users permitted to access each transmission target file are registered.

Figure 15:
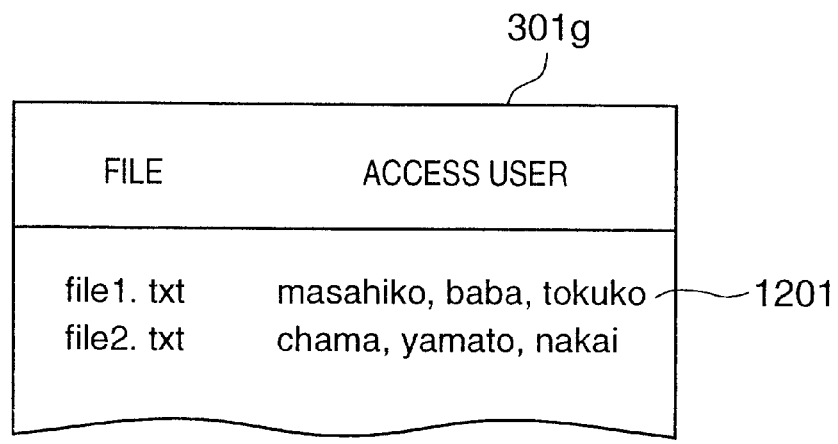
FIG. 15 is a view showing an example of an access list according to the fifth embodiment.

FIG. 15 shows an example of the access list in the fifth embodiment. For example, an entry 1201 indicates that only three users, masahiko, baba, and tokuko, are permitted to access file1.txt.

When a transmission target file is designated, a mail tool 302 extracts users who can access the designated file from the access list 301g, and automatically set the extracted users as destination users. More specifically, in step S14 in FIG. 5, an attached file generation unit 301c generates an attached file, and the mail tool 302 extracts users who can access the designated file by referring to the access list 301g. These users are then set as the destination of the mail text generated in step S11.

In such an access list, time periods in which access is permitted can be set in addition to user information.

In addition, when mail data including an attached file is generated, and destination users for this mail data are to be designated, users to which the file designated by the attached file is permitted to be transmitted may be extracted from the access list 301g, and the list of these users may be displayed to allow the sender to select desired destinations from the list.

Furthermore, when mail data including an attached file is to be transmitted, whether each designated access destination is permitted as the destination of the file designated by the attached file may be checked by referring to the access list 301g. If a given access destination is not permitted, information indicating this may be notified.

Moreover, when a user outside an access list for a transmission target file is designated as a destination user, file transmission can be realized by temporarily giving the user access permission.

Sixth Embodiment

The sixth embodiment will be described next with reference to FIGS. 16 to 19.

The file management system browser function of a file management unit 301a in the sixth embodiment will be described below. The functional arrangement and control arrangement of this embodiment are the same as those of the first embodiment.

Figure 16:
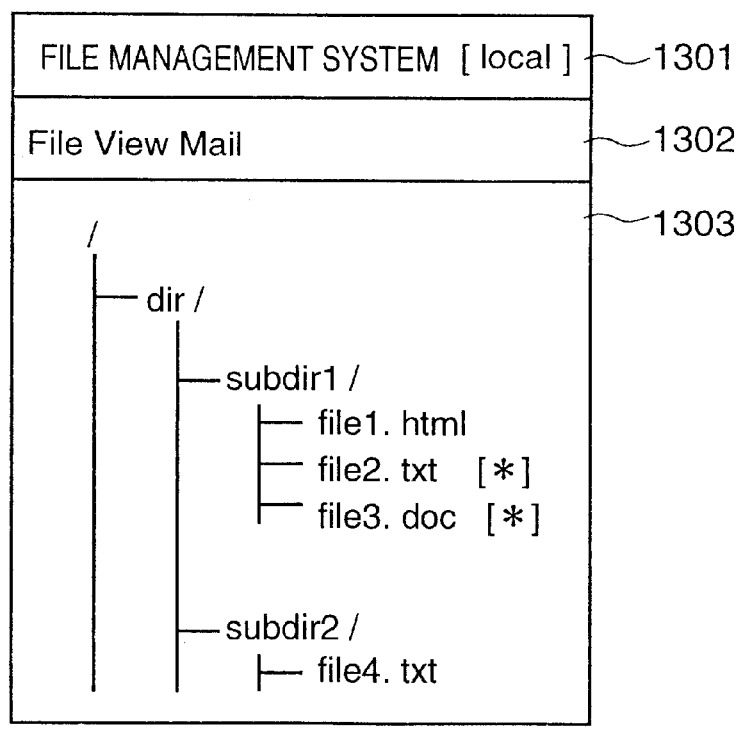
FIG. 16 is a view showing an example of a display realized by a file management system browser function according to the sixth embodiment.

FIG. 16 shows an example of the display based on the file management system browser function of the sixth embodiment. As shown in FIG. 16, the file management system browser function displays the directory and file arrangement (1303) and the like on the computer. On a portion 1301, the title of the browser and the management source of the currently displayed file system are displayed. For example, [local] on the portion 1301 indicates that the file system on the computer in which the browser is operating is selected. In addition, when an operation is to be performed for a directory or file displayed on the portion 1303, the user directly selects and designates the target directory or file on the portion 1303 in advance with a mouse, a keyboard, or the like.

A mark indicating selection is added to the directory or file selected on the portion 1303. For example, on the portion 1303, "[*]" indicates that file2.txt and file3.doc in the "/dir1/subdir1/" directory are selected as target files.

The file management system browser function includes a menu bar 1302. The menu bar 1302 includes a File menu for creation of a new directory or file, deletion, and the like, a View menu for switching file systems to be displayed, and a Mail menu for transmitting a selected file by mail. The user selects a menu item corresponding to a desired function with a mouse or keyboard, and performs a predetermined procedure, thereby realizing each function.

Figure 17:
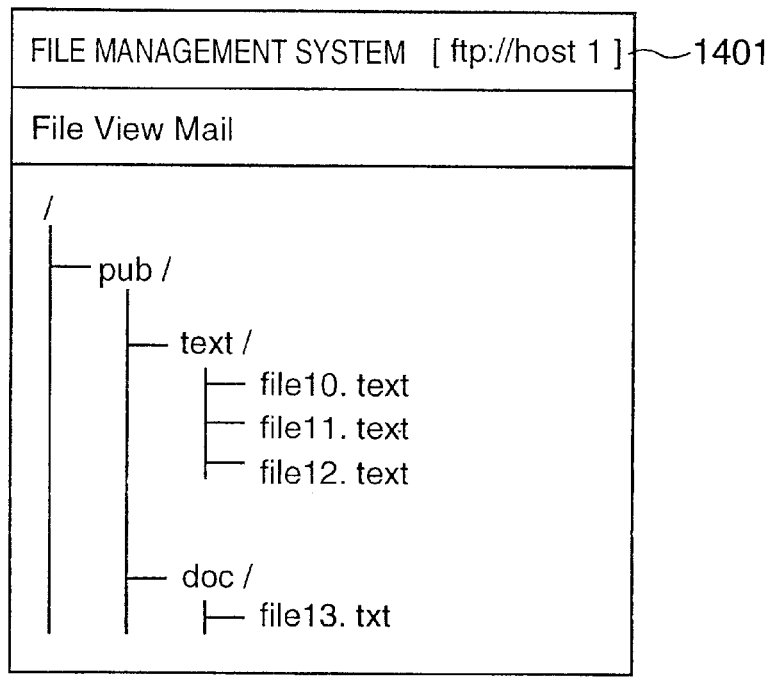
FIG. 17 is a view showing an example of a display realized by the file management system browser function according to the sixth embodiment.

FIG. 17 shows a file system displayed upon switching with the View menu of the file management system browser function. In this case, the file system controlled by the ftp file transmission server that operates on the computer "host1" is displayed (1401).

Figure 18:
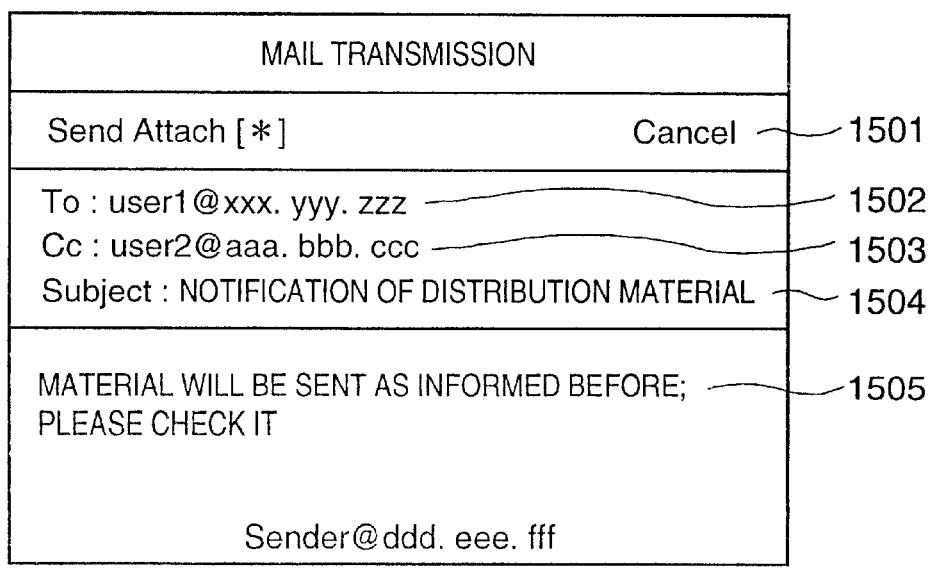
FIG. 18 is a view showing an example of a mail transmission window according to the sixth embodiment.

FIG. 18 shows a mail transmission window, which is displayed by selecting the Mail menu of the file management system browser. A procedure for transmitting a file using mail is performed in the mail transmission window. The transmission window includes three menus 1501, namely "Attach" for processing of an attached file, "Send" for transmission, and "Cancel" for cancellation of a mail transmission procedure.

Figure 20:
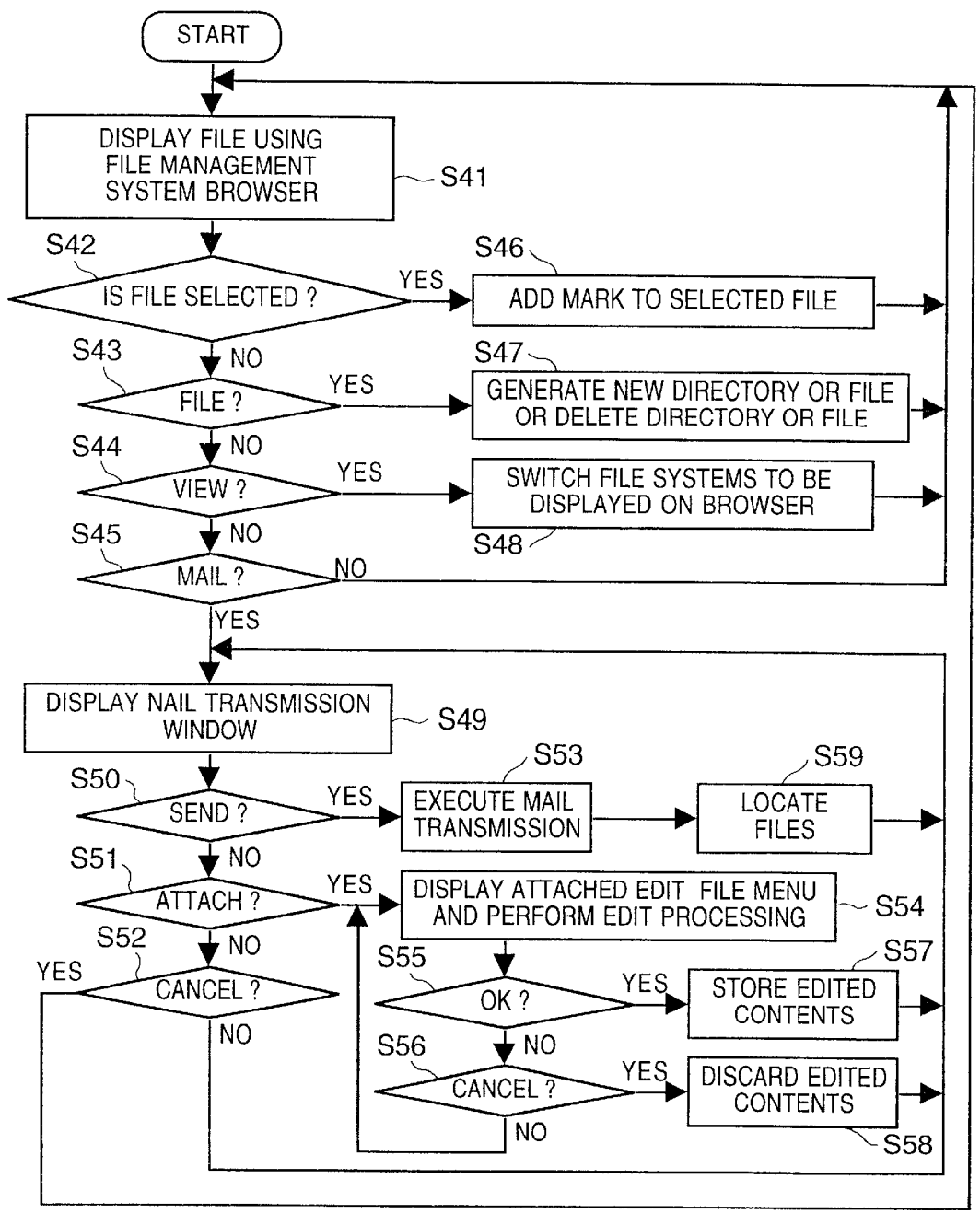
FIG. 20 is a flow chart showing a mail transmission sequence executed by a mail tool 302 according to the sixth embodiment.

In this embodiment, file transmission by mail is performed in accordance with the following sequence. FIG. 20 is a flow chart showing a sequence of mail transmission performed by a mail tool 302 in the sixth embodiment.

(1) First of all, a file list is displayed by using the file management system browser, as shown in FIG. 16 (step S41). The user selects transmission target files on the browser. When the selection of the files is designated by the user, the marks "[*]" are added to the selected/designated files (steps S42 and S46). FIG. 16 shows that file2.txt and file3.doc are selected.

(2) when the Mail menu is selected on the menu bar 1302 of the browser, the flow advances from step S45 to step S49. In step S49, a mail transmission window like the one shown in FIG. 18 is displayed. In this mail transmission window, the user inputs mail destinations (1502 and 1503 in FIG. 18), a title (1504), and a text (1505).

Figure 19:
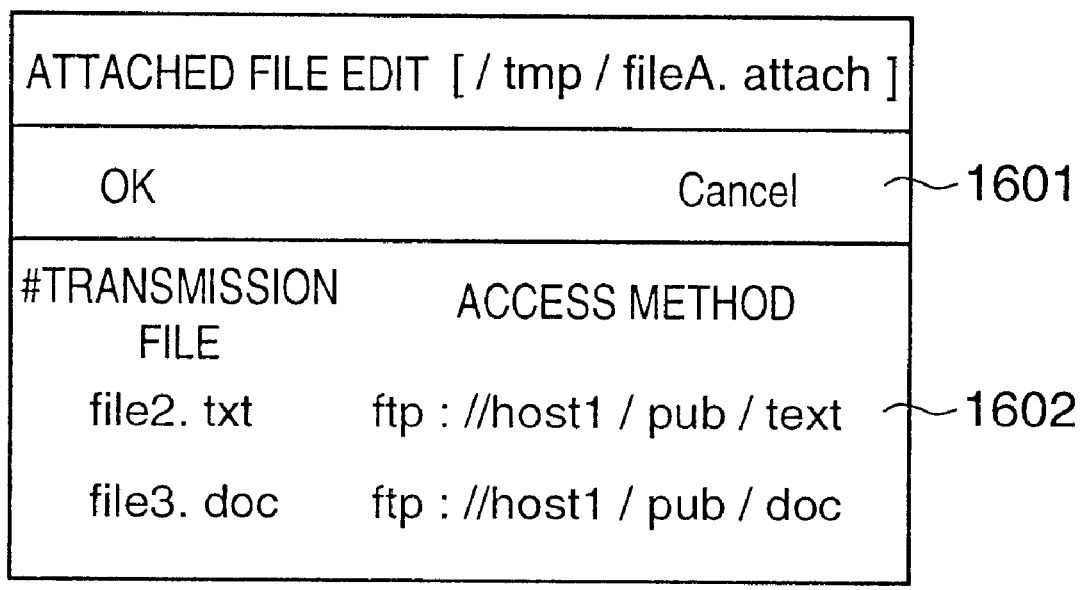
FIG. 19 is a view showing an example of an attached file edit window according to the sixth embodiment.

(3) When the Attach menu in the mail transmission window is selected after necessary data is input, the flow advances from step S51 to step S54. In step S54, an attached file generation unit 301c is activated to automatically generate an attached file to be attached to the mail, and at the same time, an attached file edit window like the one shown in FIG. 19 is displayed.

Since the files selected in advance in step (1) are set as defaults of transmission target files in the attached file edit window, the user checks the set values, and designates access methods for the respective files. The user also adds/deletes an entry, as needed. Referring to FIG. 19, for example, a portion 1602 indicates that file2.txt selected in advance can be acquired by accessing it in accordance with "ftp://hosst1/pub/text" of a URL.

If there is no problem in the settings, the user designates the OK button on a tool bar 1601 in the attached file edit window. When the OK button is designated, the flow advances from step S55 to step S57 to store the contents of the settings after the edit processing, and the user goes back to the mail transmission window. As a result, the mark "[*]" indicating that the attached file has been set is added to the Attach menu in the mail transmission window. When the Cancel button is designated, the flow advances from step S56 to step S58 to discard the edit contents, and the user goes back to the mail transmission window.

(4) The mail is transmitted by using the Send menu in the mail transmission window. That is, when the user designates "Send", the flow advances from step S50 to step S53 to transmit the attached file attached to the mail message to the receiver.

In accordance with this operation, the transmission target files selected in step (1) are transferred onto a proper file transmission server and located thereon on the basis of the access methods designated in step (3) (step S59) More specifically, since the two files selected by the attached file in FIG. 19 are stored on a local disk of the sender, these files cannot be transmitted in this state in response to an external transmission request. For this reason, these two local files are transferred (moved or copied) to the designated directories (/pub/text/ and /pub/doc/ in this case) of the designated FTP server (host1 in this case).

Obviously, the sender can check whether the transmission target files are properly arranged, by designating the file system on the file transmission server which is to be displayed on the browser with the View menu of the file management system (steps S44 and S48).

If the transmission target files have already been arranged on the transmission server designated by the access methods, no transfer is required. For example, this includes a case wherein the sender selects transmission files on the browser in FIG. 17 on which the files managed on the TFP server are displayed. When the user selects a file on the browser in FIG. 17, since the location of the file is recognized by the mail tool, an access method can be automatically written in the attached file in step S54.

(5) The mail receiver receives the files arranged on the file transmission server in accordance with the access methods described in the attached file, for example, by using the ftp client tool in this case. The transmission of the files intended by the mail sender is then complete.

In each embodiment described above, the mail sender designates transmission target files. Obviously, however, a given application program may perform such designation. When, for example, the document edited by the user with a wordprocessor program is to be transmitted to another user by electronic mail, the wordprocessor program designates the edited document file as a transmission target file, and activates the above attached file generation means and electronic mail transmission means.

FIG. 22 is a block diagram for showing the functional arrangement of a file management/transmission tool 1701 according to the sixth embodiment. An illustration of the functional arrangement on the file receiving side and the mail server is omitted from FIG. 22. Referring to FIG. 22, a file management/selection unit 301*a* stores and manages transmission target files, and is arranged to select a file for attachment to an item of mail, the selected file being stored in a first memory of the network selectable by the sender. A transfer unit 301*h* is arranged to, when the selected file cannot be sent to the receiver from the first memory, transfer the selected file to a second memory of the network from which the file can be sent to the receiver. A designation unit 301*i* is arranged to designate an access method for the selected file.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the present invention, in transmission of files using electronic mail, the loads imposed on computer resources, computer network resources, and the user can be reduced. In addition, the present invention can implement various extension functions and applications that are not implementable in the prior art in which a file itself is added to a mail message. Electronic mail can therefore be used very effectively.

Furthermore, according to the present invention, since the electronic mail system itself need not be expanded and modified, no problem is posed in terms of interconnection characteristics to which the utmost importance is attached in the electronic mail system.

As many apparently widely different embodiments of the present invention can be made without departing from the spirit and scope thereof, it is to be understood that the invention is not limited to the specific embodiments thereof except as defined in the claims.

What is claimed is:

1. An information processing system capable of transmitting a file from a sender to a receiver of a network, said system comprising:

a selection unit, arranged to select a file for attachment to an item of mail, the selected file being stored in a first memory of the network selectable by the sender;

a designation unit, arranged to designate, by the sender, an access method to access the selected file;

a transfer unit, arranged to, if the selected file cannot be sent to the receiver from the first memory based on the designation access method, transfer the selected file to a second memory of the network from which the file can be sent to the receiver based on the designated access method, and not to transfer the selected file to the second memory of the network if the selected file can be sent to the receiver from the first memory based on the designated access method;

a generator, arranged to generate the item of mail with the designated access method to access the selected file;

a communication unit, arranged to transmit/receive the item of mail with the designated access method through the network;

an extraction unit, arranged to extract the designated access method from the item of mail; and an acquisition unit, arranged to acquire the file through the network based on the extracted access method.

2. The system according to claim 1, wherein said acquisition unit includes:

an issue unit, used by the receiver to issue a file transmission request based on the extracted access method;

a search unit, arranged to search for a corresponding file based on the transmission request upon reception of the transmission request; and a sending unit, arranged to send the file searched for by the search unit to the receiver.

3. The system according to claim 2, further comprising a checking unit, arranged to check a validity of a file searched for by said search unit, based on attribute information of the file.

4. The system according to claim 3, wherein said generator generates the item of mail with the address and the attribute information of the selected file, the file transmission request issued by said issue unit includes the attribute information of the file, and said checking unit determines the validity of the file searched by said search unit based on attributes of the file searched out by said search unit and the attribute information included in the file transmission request.

5. The system according to claim 4, wherein said checking unit inhibits said sending unit from sending the searched-for file upon determining that the searched-for file is invalid.

6. The system according to claim 3, wherein the attribute information includes a data size of the file.

7. The system according to claim 3, wherein the attribute information includes a final update date of the file.

8. The system according to claim 3, wherein the attribute information includes version information of the file.

9. The system according to claim 2, further comprising:

a registration unit, arranged to, when said generator generates the item of mail with the access method, register the selected file in a record; and a transmission recorder, arranged to record a transmission state in the record depending on how the file is acquired by said acquisition unit.

10. The system according to claim 9, wherein, when said issue unit issues the file transmission request, said transmission recorder handles a corresponding file in the record as a transmitted file.

11. The system according to claim 9, wherein said registration unit registers a mail sender name and a file receiver name for each file in the record, and said search unit makes a search in accordance with the transmission request when a mail sender name and a file receiver name included in the transmission request coincide with a mail sender name and a file receiver name registered in the record.

12. The system according to claim 1, further comprising a display unit, arranged to display a file list of files stored in the memory, wherein said selection unit selects the file from the file list displayed by said display unit.

13. The system according to claim 1, further comprising a display unit, arranged to display the file acquired by said acquisition unit.

14. The system according to claim 1, wherein said acquisition unit acquires the file by activating a suitable browser program based on an access method, and transfers the access method to the browser program.

15. The system according to claim 1, wherein the access method includes a transfer protocol.

16. The system according to claim 1, further comprising a proxy server for mediating communication of the file acquired by said acquisition unit.

17. The system according to claim 16, wherein said proxy server includes:

a holder, arranged to hold the file selected by said selection unit; and a transmitter, arranged to, when the file requested by said acquisition unit is held in the holder, transmit the held file to the receiver through said proxy server.

18. The system according to claim 17, wherein said generator generates the item of mail with the address and an access method for said proxy server.

19. The system according to claim 1, further comprising:

an access list in which users who can be file destinations are registered in units of transmission target files; and a setting unit, arranged to set a destination of the item of mail with an address of the file selected by said selection unit, based on a file destination obtained from said access list for the selected file.

20. The system according to claim 19, wherein said setting unit sets all file destinations registered in said access list for the selected file as destinations of the item of mail.

21. The system according to claim 19, wherein said setting unit includes:

a display controller, arranged to display file destinations registered in said access list for the selected file; and a destination setting unit, arranged to set a designated file destination designated from the file destinations displayed by the display controller as a destination of the item of mail.

22. The system according to claim 1, further comprising:

an access list in which users who can be file destinations are registered in units of transmission target files; and a limiter, arranged to limit, in said communication unit, a destination of the item of mail generated by said generator, based on a file destination obtained from said access list for the selected file.

23. An information processing apparatus capable of transmitting a file from a sender to a receiver on a network, said apparatus comprising:

a selection unit, arranged to select a file for attachment to an item of mail, the selected file being stored in a first memory of the network selectable by the sender;

a designation unit, arranged to designate, by the sender, an access method to access the selected file;

a transfer unit, arranged to, if the selected file cannot be sent to the receiver from the first memory based on the designated access method, transfer the selected file to a second memory of the network from which the file can be sent to the receiver based on the designated access method, and not transfer the selected file to the second memory of the network if the selected file can be sent to the receiver from the first memory based on the designated access method;

a generator, arranged to generate the item of mail with the designated access method to access the selected file; and a communication unit, arranged to transmit the item of mail with the designated access method through the network.

24. The apparatus according to claim 23, further comprising a display unit, arranged to display a file list of files stored in the memory, wherein said selection unit selects the file from the list displayed by said display unit.

25. The apparatus according to claim 23, wherein the access method includes a transfer protocol.

26. The apparatus according to claim 23, further comprising:

an access list in which users who can be file destinations are registered in units of transmission target files; and a limiter, arranged to limit, in said communication unit, a destination of the item of mail generated by said generator, based on a file destination obtained from said access list for the selected file.

27. The apparatus according to claim 23, further comprising:

an access lit in which users who can be file destinations are registered in units of transmission target files; and a setting unit, arranged to set a destination of the item of mail with an address of the file selected by said selection unit, based on a file destination obtained from said access list for the selected file.

28. The apparatus according to claim 27, wherein said setting unit sets all file destinations registered in said access list for the selected file as destinations of the item of mail.

29. The apparatus according to claim 27, wherein said setting unit includes:

a display controller, arranged to display file destinations registered in said access list for the selected file; and a destination setting unit, arranged to set a file destination designated from the file destinations displayed by said display controller as a destination of the item of mail.

30. The apparatus according to claim 23, further comprising:

a search unit, arranged to search for a corresponding file based on a transmission request from the receiver; and a sending unit, arranged to send the file searched for by said search unit out to the receiver.

31. The apparatus according to claim 30, further comprising:

a registration unit, arranged to, when said generator generates the item of mail with the access method, register the selected file in a record; and a transmission recorder, arranged to record a transmission state in the record depending on how the file is sent by said sending unit.

32. The apparatus according to claim 31, wherein said registration unit registers a mail sender name and a file receiver name for each file in the record, and said search unit makes a search in accordance with the transmission request when the mail sender name and the file receiver name included in the transmission request coincide with a mail sender name and a file receiver name registered in the record.

33. The apparatus according to claim 30, further comprising a checking unit, arranged to check a validity of a file searched for by said search unit, based on attribute information included in the transmission request.

34. The apparatus according to claim 33, wherein said checking unit inhibits said sending unit from sending the searched-for file upon determining that the searched-for file is invalid.

35. The apparatus according to claim 33, wherein the attribute information includes a data size of the file.

36. The apparatus according to claim 33, wherein the attribute information includes a final update date of the file.

37. The apparatus according to claim 33, wherein the attribute information includes version information of the file.

38. A control method for an information processing system capable of transmitting a file from a sender to a receiver on a network, said method comprising:

a selection step of selecting a file for attachment to an item of mail, the selected file being stored in a first memory of the network selectable by the sender;

a designation step of designating, by the sender, an access method to access the selected file;

a transfer step of, if the selected file cannot be sent to the receiver from the first memory based on the designated access method, transferring the selected file to a second memory of the network from which the file can be sent to the receiver based on the designated access method, and not transferring the selected file to the second memory of the network if the selected file can be sent to the receiver from the first memory based on the designated access method;

a generation step of generating the item of mail with the designated access method to access the selected file;

a communication step of transmitting/receiving the item of mail with the designated access method through the network;

an extraction step of extracting the designated access method from the item of mail; and an acquisition step of acquiring the file through the network based on the extracted access method.

39. An information processing method for an information processing apparatus capable of transmitting a file by using a mail system of a network from a sender to a receiver on a network, said method comprising:

a selection step of selecting a file for attachment to an item of mail, the selected file being stored in a first memory of the network selectable by the sender;

a designation step of designating, by the sender, an access method to access the selected file;

a transfer step of, if the selected file cannot be sent to the receiver from the first memory based on the designated access method, transferring the selected file to a second memory of the network from which the file can be sent to the receiver based on the designated access method, and not transferring the selected file to the second memory of the network if the selected file can be sent to the receiver from the first memory based on the designated access method;

a generation step of generating the item of mail with the designated access method to access the selected file; and a communication step of transmitting the item of mail with the designated access method through the network.

40. A computer-readable memory storing a control program for implementing a method of transmitting a file from a sender to a receiver on a network, the control program comprising:

program code for a selection step of selecting a file for attachment to an item of mail, the selected file being stored in a first memory of the network selectable by the sender;

program code for a designation step of designating, by the sender, an access method to access the selected file;

program code for a transfer step of, if the selected file cannot be sent to the receiver from the first memory based on the designated access method, transferring the selected file to a second memory of the network from which the file can be sent to the receiver based on the designated access method, and not transferring the selected file to the second memory of the network if the selected file can be sent to the receiver from the first memory based on the designated access method;

program code for a generation step of generating the item of mail with the designated access method to access the selected file; and program code for a communication step of transmitting the item of mail with the designated access method through the network.

41. A computer-readable memory storing a control program for a method of transmitting a file from a sender to a receiver on a network, the control program comprising:

program code for a selection step of selecting a file for attachment to an item of mail, the selected file being stored in a first memory of the network selectable by a sender;

program code for a designation step of designating, by the sender, an access method to access the selected file;

program code for a transfer step of, if the selected file cannot be sent to the receiver from the first memory based on the designated access method, transferring the selected file to a second memory of the network from which the file can be sent to the receiver based on the designated access method, an not transferring the selected file to the second memory of the network if the selected file can be sent to the receiver from the first memory based on the designated access method;

program code for a generation step of generating the item of mail with the designated access method to access the selected file;

program code for a communication step of transmitting/receiving the item of mail with the designated access method through the network;

program code for an extraction step of extracting the designated access method from the item of mail; and program code for an acquisition step of acquiring the file through the network based on the extracted access method.

* * * * *

UNITED STATES PATENT AND TRADEMARK OFFICE
CERTIFICATE OF CORRECTION

PATENT NO.    : 6,466,968 B2
DATED         : October 15, 2002
INVENTOR(S)   : Masahiko Shirai et al.

It is certified that error appears in the above-identified patent and that said Letters Patent is hereby corrected as shown below:

Column 1,
Line 62, "application/msword" should read -- application/MSWord --.

Column 8,
Line 16, "attache" should read -- attached --.

Column 12,
Line 60, "S59)" should read -- S59). --.

Column 17,
Line 1, "lit" should read -- list --.

Column 19,
Line 12, "an" should read -- and --.

Signed and Sealed this

Eleventh Day of March, 2003

JAMES E. ROGAN
*Director of the United States Patent and Trademark Office*